United States Patent [19]
Kriebel et al.

[11] 3,918,934
[45] Nov. 11, 1975

[54] PROCESS FOR PURIFYING GASES

[75] Inventors: Manfred Kriebel, Frankfurt am Main; Gerhard Hochgesand, Neu-Isenburg, both of Germany

[73] Assignee: Metallgesellschaft Aktiengesellschaft, Frankfurt am Main, Germany

[22] Filed: May 22, 1973

[21] Appl. No.: 362,988

[30] Foreign Application Priority Data
June 3, 1972 Germany............................ 2227071

[52] U.S. Cl. .............................. 55/48; 55/68; 55/73
[51] Int. Cl.² .................... B01D 50/00; B01D 53/14
[58] Field of Search ...................... 55/48, 51, 68, 73

[56] References Cited
UNITED STATES PATENTS

| | | | |
|---|---|---|---|
| 3,069,829 | 12/1962 | Worley | 55/73 |
| 3,492,788 | 2/1970 | Hochgesand et al. | 55/68 |
| 3,664,091 | 5/1972 | Hegwer | 55/48 |
| 3,710,546 | 1/1973 | Grünewald et al. | 55/73 |
| 3,738,086 | 6/1973 | Bellisio et al. | 55/48 |

*Primary Examiner*—Charles N. Hart
*Assistant Examiner*—Peter A. Hruskoci
*Attorney, Agent, or Firm*—Burgess, Dinklage & Sprung

[57] ABSTRACT

Gases such as commercial fuel gases and synthesis gases are purified by scrubbing under pressure with an organic absorbent which is circulated through an absorption stage and a regeneration stage. Absorbent entrained as a vapor and/or mist in the gas leaving the absorption stage is removed by scrubbing with a solvent having a vapor pressure lower by at least one power of 10 than that of the absorbent. Thereafter the absorbent-solvent mixture is distilled to remove the absorbent from the solvent. The process is particularly useful for removing sulfur containing impurities from fuel gases. N-methyl-pyrrolidone can be used as the absorbent and polyethylene glycols can be used as the solvent.

7 Claims, 1 Drawing Figure

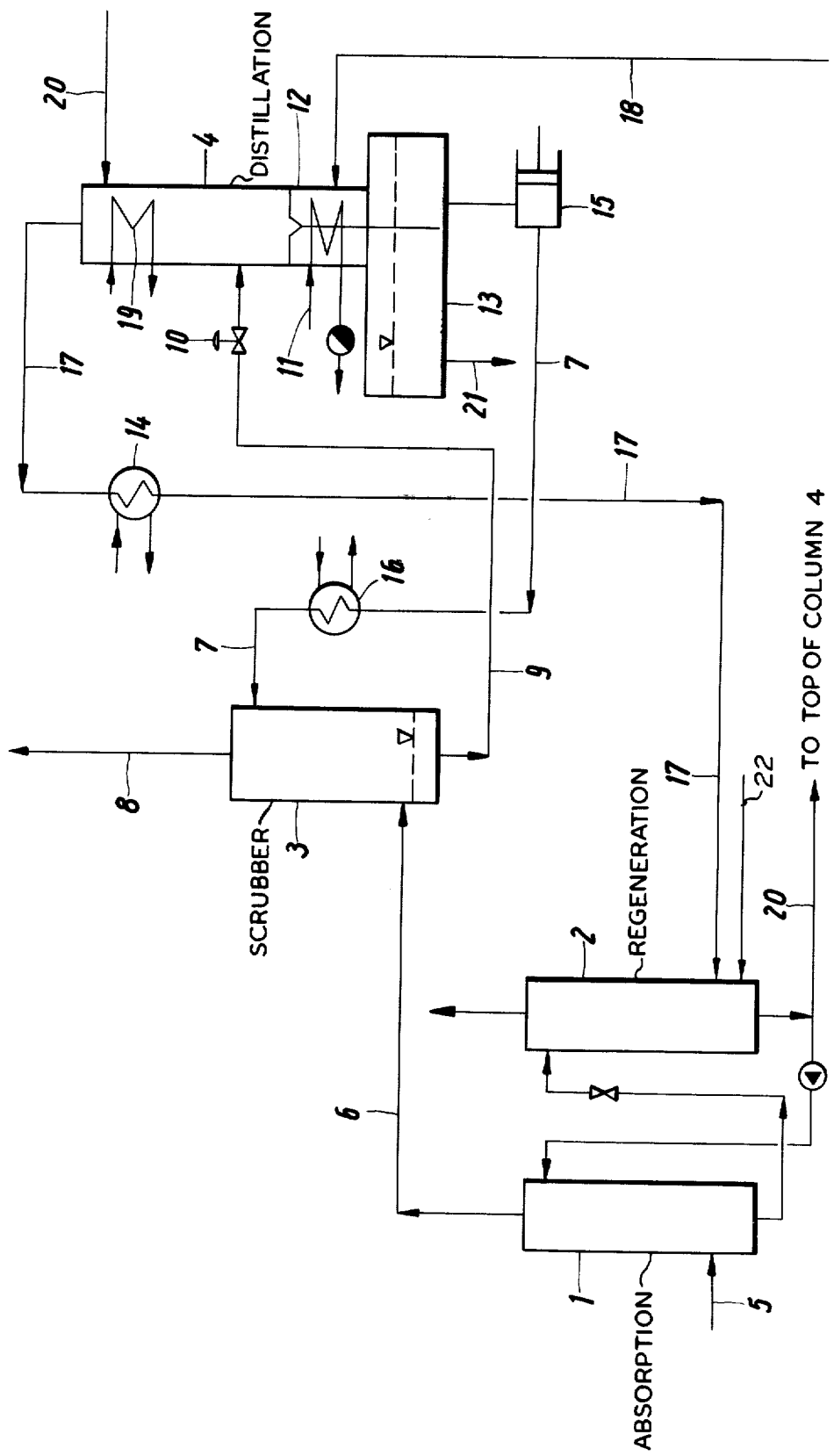

PROCESS FOR PURIFYING GASES

BACKGROUND

This invention relates to a process for purifying fuel gases to remove impurities such as sulfur containing compounds. More particularly, this invention relates to a process for purifying gases by scrubbing under pressure with an organic absorbent and thereafter removing entrained absorbent by scrubbing with a higher boiling solvent.

Commercial fuel gases and synthesis gases are purified by scrubbing the gases with organic solvents under pressure. In some of these processes, organic solvents having a low volatility and having boiling points above the boiling point of water are used as an absorbent for hydrogen sulfide, carbon oxysulfide, organic sulfur compounds, such as mercaptans or organic sulfides, and other impurities. The absorbent which has absorbed the gas impurities is regenerated by a pressure-relief to atmospheric or a lower pressure in one or more stages and subsequent stripping with a gas or vapor, which may be accompanied by a temperature rise. The regenerated absorbent is then recycled to the adsorption stage.

Known organic solvents which are suitable for such processes are, for example, propylene carbonate, polyethylene glycol ether, N-methylpyrrolidone, and others.

The purification of gases by scrubbing with a high-boiling organic solvent is accompanied by a phenomenon which could previously be disregarded in many cases but which may give rise to serious troubles in operation.

Depending on existing temperature and pressure conditions, small amounts of absorbent are entrained by the gases leaving the absorption tower and the exhaust gas from the regeneration. This lost absorbent may endanger subsequent stages of the plant, such as catalysts, conduit seals, control valves, and the loss may be economically significant. For this reason, the recovery of the residual absorbent from the pure gas is in many cases an essential requisite of the gas-purifying process.

DOS 1,801,539 (U.S. Pat. No. 3,492,788) discloses a process of purifying commercial gases in which the impurities contained in the gases are absorbed in a high-boiling organic solvent under pressure. In this process, the gas streams fed to the process are scrubbed with the absorbent to remove water vapor and the gas streams leaving the process are scrubbed with water to remove the solvent vapor. The solvent-water mixtures drained from these scrubbing steps are processed together in a stripping distillation unit wherein exhaust gas from the flash regeneration of the laden absorbent from the actual gas-purifying stage is used as a stripping agent and pure absorbent is recovered as a sump product. This process can be used in cases where the moisture content of the pure gas does not effect its further use, for example, when a raw gas containing CO and $H_2$ produced by a gasification of a heavy oil with water vapor and oxygen is purified and subjected to a conversion reaction in which its CO content is reacted with water vapor to form carbon dioxide and hydrogen and thereafter scrubbed to remove carbon dioxide so that hydrogen of high purity is obtained, or when a natural gas is purified and catalytically cracked with water vapor on an indirectly heated catalyst in a tubular heater to produce a gas which contains CO and $H_2$. In the second case, the gas before being purified is dried so that the water content of the absorbent is held at a constant, preferably low value. The process, however, cannot be used if the gas to be purified has to be completely dried.

DOS 1,494,803 discloses a process of drying and purifying utility gases, which must be dried before they are purified to remove sulfur compounds and/or $CO_2$. To dry the moist gas, the same is scrubbed with di- or triethylene glycol. To keep the scrubbing agent from the absorbent which is used in the succeeding gas-purifying stage, the dried gas is scrubbed with part of the absorbent used in the gas-purifying stage before the gas is admitted to said stage. The liquid mixture which is thus formed is vacuum-distilled to recover the absorbent.

Another cause of losses of absorbent in connection with processes in which commercial gases are purified by being scrubbed with high-boiling organic solvent resides in the decomposition of the absorbent which is circulated through the absorption and regenerating stages or in the irreversible reaction of said absorbent with gas components, whereby impurities may be formed which are not removed by the regeneration so that they are enriched in the absorbent.

It is known to distill the absorbent so as to separate impurities which are still contained in the absorbent when it has been regenerated. In this way, lower-boiling impurities can be distilled from the absorbent and the latter can be distilled from higher-boiling impurities.

DOS 1,494,809 discloses a process of scrubbing sulfur-free fuel gases or synthesis gases to remove $CO_2$, where N-methylpyrrolidone is used as the absorbent and an additional distillation step is employed to regenerate the absorbent in conjunction with the distillation of the absorbent-water mixtures which have been formed by the preliminary drying of the gas to be purified and by the scrubbing of the pure gas and of the exhaust gas coming from the regeneration step.

SUMMARY

The present invention relates to a process wherein the residual absorbent which, in the purification of commercial gases by scrubbing them under pressure with organic absorbents having a higher boiling point than water, is entrained in the pure gas leaving the absorption stage, is separated from the pure gas.

This residual absorbent may be contained in the pure gas not only as vapor but also as mist and it has been found that this residual absorbent can be separated by scrubbing with a solvent which has a higher boiling point and a much lower vapor pressure than the absorbent itself. The absorbent which has been removed by scrubbing with such solvent can be recovered from the latter by a distillation, which because of the high boiling point of the solvent, can be combined in a desirable manner with the purification of the absorbent to remove impurities which cannot be removed by the regeneration.

The present invention thus relates to a process for purifying commercial fuel gases or synthesis gases by scrubbing them under pressure with an organic absorbent, which is circulated through the absorption stage and a regenerating stage.

The process according to the invention comprises removing absorbent entrained as vapor and/or mist in the pure gas leaving the absorption stage by scrubbing the gas with a solvent having a vapor pressure lower by at least one power of 10 than that of the absorbent, and thereafter distilling the absorbent from the solvent.

DESCRIPTION OF THE DRAWING

The accompanying drawing is a schematic flow diagram for carrying out the process of the invention.

DESCRIPTION

Suitable solvents having a much lower vapor pressure are for example, polyethylene glycols, preferably triethylene glycol and tetraethylene glycol.

The absorbent may be distilled from the higher-boiling solvent under subatmospheric or atmospheric pressure, desirably with the aid of a stripping gas such as nitrogen.

The solvent-absorbent mixture which is to be separated is fed to the distillation column on a medium-level plate. A dephlegmator is provided at the top of the column to produce a sufficient reflux.

In a preferred embodiment of the invention, the required reflux in the column is produced by diverting a small branch stream from the stream of the regenerated absorbent, which in the gas-purifying plant proper is returned from the regenerating unit to the absorption unit, and this branch stream is fed to the distillation column at its top. This feeding of a reflux from the outside may eliminate the need for a dephlegmator or may at least relieve the same. The branch stream of regenerated absorbent which is fed as a reflux at the top of the distillation column is further regenerated in said column in that the absorbent is distilled from higher-boiling impurities and decomposition products which are enriched therein. The absorbent which has thus been purified and the absorbent which has been recovered by scrubbing from the pure gas are jointly recovered as the overhead product of this distillation.

In another embodiment of the invention, the solvent-absorbent mixture is distilled under atmospheric pressure with the aid of a stripping gas. In this procedure, a reflux of distillate may also be produced by a dephlemator or by feeding the branch stream of regenerated absorbent. The stripping distillation under normal pressure will be preferred if the laden absorbent in the gas-purifying plant proper is regenerated by stripping with a gas, such as nitrogen.

In the stripping distillation of the solvent-absorbent mixture the same stripping gas is then used as in the regeneration of the laden absorbent, and the overhead product of the distillation column, consisting of absorbent vapor and stripping gas, and the stripping gas fed to the regenerating column are united before they are fed to the regenerating column. In this case, the absorbent vapor is condensed into the absorbent being regenerated or is retained at the top of the regenerating tower.

The scrubbing of the residual solvent from the exhaust gas from the regenerating unit of the gas-purifying plant proper may basically be performed in the same manner as the scrubbing of the residual absorbent from the pure gas. In this case the exhaust gas from the regenerating unit is scrubbed in a separate scrubbing zone with the high-boiling solvent which is also used to scrub the pure gas stream. The resulting solvent-absorbent mixture is then also processed in the distillation column. It may be desirable, however, to scrub the exhaust gas coming from the regenerating unit of the gas-purifying plant proper with water in the conventional, known manner in order to recover the absorbent entrained thereby and to distill the water from the liquor which has been formed by the scrubbing step.

The drawing shows by way of example a flow scheme of a plant for carrying out the process according to the invention. An absorption tower 1 and a regenerating tower 2 form a gas-purifying plant proper. In the scrubbing tower 3, the purified gas is scrubbed with the higher-boiling solvent to remove the residual solvent entrained by the gas. The absorbent-solvent mixture is separated in a distillation column 4.

The gas to be purified is fed under superatmospheric pressure through conduit 5 into the absorption tower 1 and is contacted therein with countercurrent flowing absorbent. The purified gas flows off at the top of the absorption tower and in conduit 6 is passed to the scrubbing tower 3, in which the gas is scrubbed under pressure with the solvent fed through conduit 7. Pure gas free of residual solvent is discharged through conduit 8 for further use.

An absorbent-solvent mixture is collected in the sump of the scrubbing tower 3 and conducted through conduit 9 and pressure-relief valve 10 to a medium-level plate of the distillation column 4.

The sump of distillation column 4 contains heater 11 and is connected via 12 to an intermediate reservoir 13 for the solvent, which is retained as a sump product. From this intermediate reservoir 13, the solvent is recycled by a pump 15 through the conduit 7 and a cooler 16 to the top of the scrubbing tower 3.

The absorbent is recovered as the overhead product of the distillation and is discharged through conduit 17 and, if desired, through a condenser 14.

The distillation column 3 may be operated under normal or reduced pressure, and the distillation may be assisted by a stripping gas, which is supplied into the sump of the column through a conduit 18, in which case the condenser 14 is omitted.

A reflux of distillate in the distillation column 4 may be produced by a dephlegmator 19 which is provided at the top of the column. Preferably, however, a branch stream is diverted from the regenerated absorbent flowing from the regenerating tower 2 to the absorption tower 1 and this branch stream is fed through conduit 20 as a reflux to the top of the distillation column 4. This branch stream is thus distilled to remove higher-boiling impurities and/or decomposition products. These impurities are enriched in the solvent and in a branch stream of solvent are continuously or intermittently discharged from the intermediate reservoir 13 through a conduit 21.

The pure absorbent is the overhead product of the distillation and is returned via conduit 17 to the absorbent stream which is circulated through the absorption tower 1 and the regenerating tower. If the distillation column 4 is operated under subatmospheric pressure, the liquid discharged from the suction pump may be directly fed into the sump of the regenerating tower.

If the distillation is assisted by a stripping gas, the gas-containing overhead product may be fed to the sump of the regenerating tower in the same way.

It will be sufficient in many cases to regenerate the laden absorbent in the regenerating tower 2 by pressure-relieving the absorbent to ambient pressure and stripping with an inert gas such as nitrogen fed in via conduit 22 without need for a supply of substantial heat. In this mode of operation, the distillation performed in the distillation column 4 is suitably a stripping distillation and the distillation column is fed for this purpose with a branch stream 18 of the stripping gas 22 used in the regenerating tower 2.

The following example serves for a more detailed explanation of the invention.

Natural gas is desulfurized by scrubbing at ambient temperature under a pressure of 75 kilograms per square centimeter absolute pressure with N-methylpyrrolidone as the absorbent.

To purify this gas, N-methylpyrrolidone is circulated through the absorption tower 1 and the regenerating tower 2. In the regenerating tower 2, the laden absorbent is regenerated by a pressure-relief to a slightly superatmospheric pressure and stripping with inert gas (such as nitrogen or purified fuel gas). The desulfurized gas at a rate of 100,000 standard cubic meters per hour leaves the absorption tower 1 at 25°C. under a pressure of 74 kilograms per square centimeter absolute pressure and entrains 10–20 ppm N-methylpyrrolidone vapor and mist, which corresponds to a loss of about 5 kilograms per hour. In the scrubbing tower 3, entrained absorbent is removed to leave a residue of less than 1 ppm by scrubbing under pressure with tetraethylene glycol, which is fed to scrubber 3 at a rate of 1 cubic meter per hour and at a temperature of about 40°C. via conduit 7. Pure natural gas under pressure is withdrawn from scrubber 3 via conduit 8 for further use.

A mixture of tetraethylene glycol and N-methylpyrrolidone is withdrawn from the sump of the scrubbing tower 3. After a pressure relief to 1.8 kilograms per square centimeter absolute pressure, the mixture is fed into the distillation column 4. The sump of the column 4 is maintained at 200°C. by the steam-fed heater 11. Stripping gas (such as nitrogen or purified fuel gas) at a rate of 600 standard cubic meters per hour are fed through conduit 18 into the sump of the column. From the absorbent which is returned from the regenerating tower 2 to the absorbent tower 1, regenerated N-methylpyrrolidone at 25°C. is branched off and is fed as a reflux to the top of column 4 through conduit 20.

The overhead product of the column 4 consists of 4.5–5 kilograms N-methylpyrrolidone and 600 standard cubic meters stripping gas (nitrogen) per hour and is supplied to the regenerating tower together with the inert gas (nitrogen) stream fed thereto.

Boiling point and vapor pressure data for absorbents and solvents that can be used in carrying out the invention as described herein are as follows:

|  | Boiling Point, 760 mm Hg. °C. |
|---|---|
| Absorbents |  |
| N-methylpyrrolidone | 206 |
| Propylene Carbonate | 240 |
| Polyethylene glycol ether | (approx. 174) |
| Solvents |  |
| Triethylene glycol | 286 |
| Tetraethylene glycol | (340) |

What is claimed is:

1. In a process for purifying gases by scrubbing under pressure with an organic absorbent which is circulated through an absorption stage and a regeneration stage, the improvement which comprises removing absorbent entrained as a vapor and/or mist in the gas leaving the absorption stage by scrubbing with a solvent having a vapor pressure lower by at least one power of 10 than that of the absorbent, and thereafter distilling the solvent-absorbent mixture which results from scrubbing of the gas with said solvent, recovering said absorbent as the overhead product and returning same to the absorbent being circulated through the absorption and regeneration stages, recovering said solvent as the sump product and recycling same to the solvent scrubbing step.

2. Process of claim 1 wherein said solvent is a polyethylene glycol.

3. Process of claim 2 wherein said solvent is triethylene glycol or tetraethylene glycol.

4. Process of claim 1 wherein said solvent-absorbent mixture is distilled under subatmospheric pressure.

5. Process of claim 1 wherein said solvent-absorbent mixture is distilled with the aid of a stripping gas which is recovered and recycled with said overhead product to said regeneration stage where said gas is used as a stripping gas in the regeneration stage.

6. Process of claim 1 wherein a reflux for the distillation of the absorbent-solvent mixture is produced by feeding a branch stream of absorbent diverted from the regeneration stage.

7. Process of claim 6 wherein higher-boiling impurities contained in the absorbent fed as a reflux to the distillation are continuously removed from the sump of the distillation in a branch stream of the solvent.

* * * * *